Patented Sept. 4, 1945

2,384,111

UNITED STATES PATENT OFFICE 2,384,111

TRANSPORTATION OF CAUSTIC

Dwight Means, Wadsworth, Ohio, assignor to Pittsburgh Plate Glass Company, Allegheny County, Pa., a corporation of Pennsylvania No Drawing. Application November 4, 1939, Serial No. 302,882

4 Claims. (Cl. 117—65)

This invention relates to the shipment or storage of aqueous solutions of an alkali metal hydroxide of high concentration. Sodium hydroxide solutions having a concentration of 50 percent and above are very corrosive to metals. Consequently, it is very difficult to avoid corrosion and consequent metallic contamination when such solutions are stored, or shipped in metallic containers. The problem is particularly acute when applied to the storage or shipment of solutions of 65 to 80 percent concentration. Solutions of such concentrations are solid at atmospheric temperature and in loading and unloading it is found necessary to heat the solution above 150° F., preferably to about 180–200° F. Since caustic solutions are extremely corrosive at these temperatures, it is practically impossible to avoid contamination of the solution during storage or shipment in metal tanks or tank cars.

Numerous paint coatings have been tested but have been unsuccessful. Attempts have been made to avoid iron contamination by use of nickel-lined cars but in such cases the nickel pickup often is excessive.

In accordance with my invention I have found that caustic solutions of high concentration may be stored or shipped without contamination by use of metallic tanks or tank cars, the interior surfaces of which are coated with rubber latex. The latex may be applied to the sandblasted interior surface of the tank and may be cured, if desired, or it may be uncured. In general, it is found desirable to condition the latex coating after application by filling the car with a caustic solution of high concentration, preferably in excess of 45 percent strength and heating above 150° F. (generally not in excess of 220° F.) for a suitable period of time, preferably in excess of 12 hours. This conditioning treatment toughens the coating. If the latex composition contains vulcanizing agents, it may be vulcanized by the conditioning treatment.

In general, it is desirable to incorporate sulfur and other suitable vulcanizing agents and accelerators in the latex in order to permit vulcanization of the coating after application. The thickness of the coating is preferably in excess of 0.001 inch.

In the application of the coating it is usually desirable to apply a primer of a suitable rubber cement such as "thermoprene" upon the base prior to application of the latex. The latex coating may then be applied. In order to secure a surface which is suitably resistant it is generally found preferable to apply a series, in most cases four or more, of thin coats of the latex composition. By application of the coating in this manner, it is found that the resistance of the coated surface is improved materially.

Successive coats may be compounded to a different degree giving a different grade of rubber next to the steel than is exposed to the caustic. Thus, desirable coatings may be secured by utilizing a base coating containing little or no sulphur and increasing amounts of sulphur in the outside coatings whereby a gradated effect is secured. Regular 60% rubber latex can be used without compounding, if desired. However, the quality of the composition may be improved with the addition of compounding materials such as sulphur, rubber vulcanizing agents and accelerators, fillers such as titanium dioxide or mica, etc.

The following illustrates a suitable composition for this purpose:

| | Parts by weight |
|---|---|
| Rubber latex | 100 |
| Sulphur | 1 |
| Dibetanaphthyl para phenylene diamines | 1 |
| "Butyl Zimate" | 1 |
| Dispersing agent (Darvan) | 0.12 |
| Caustic soda | 0.15 |
| Casein | 0.13 |

The films of latex so produced are found to be very resistant to the attack of caustic. Thus, it is possible to ship or store caustic containing less than 0.001 percent of iron or other metallic impurity on the anhydrous basis without increase in the metal content of the solution over this value. In many cases, 73 percent caustic solutions containing 0.0001 to 0.0003 percent iron have been stored for long periods of time in coated iron tanks without material increase in iron content.

Pigments such as mica or titanium dioxide may be incorporated if desired, in order to improve the resistance of the coating, or to give the desired color.

Although the present invention has been described with reference to the specific details of certain embodiments thereof, it is not intended that such details shall be regarded as limitations upon the scope of the invention except insofar as included in the accompanying claims.

In the foregoing specification, and in the appended claims, the term "condition" as employed in connection with application of hot caustic soda to films of rubber latex deposited on the metal surfaces of containers is used in the broad sense to cover not only vulcanization or curing of such rubber latex films as contain vulcanizing agents, but also the toughening and improved adherence imparted to uncompounded raw rubber latex films by application of hot caustic soda where no vulcanizing agent is present.

I claim:

1. The method of protecting caustic soda solutions of 50% and upward concentration from contact with the surfaces of metallic containers in which said solutions are placed, comprising the steps of providing a quantity of rubber latex in substantially fluid form and containing a vulcanizing agent, applying a layer of said latex to said surfaces and then filling said container with hot caustic soda solution, said caustic soda solution heated to a temperature of 200° F. or above, whereby said latex is vulcanized and permanently set in position as a fixed coating on said surfaces.

2. The method of protecting a caustic soda solution of over 50 percent concentration from contact with the surfaces of a metallic container in which said solution is placed, comprising the steps of applying a layer comprising liquid rubber latex to said surfaces, filling said container with a hot caustic soda solution of over 50 percent concentration and maintaining the temperature thereof above 150° F. for a time sufficient to condition said layer to an adherent, caustic-resistant, fixed film.

3. The method of protecting caustic soda solutions of 50 percent and upward concentration from contact with the surfaces of metallic containers in which said solutions are placed, comprising the steps of providing a quantity of rubber latex in substantially fluid form and containing a vulcanizing agent, applying a layer of said latex to said surfaces and then filling said container with hot caustic soda solution whereby said latex is vulcanized and permanently set in position as a fixed coating on said surfaces.

4. A method of preserving caustic soda of a concentration of 65 to 80 per cent at a temperature at which it is in liquid state in metallic containers from contamination by the metallic surfaces, which comprises applying to the surface liquid films of rubber latex containing sulphur, an accelerator of vulcanization and an anti-oxidant and curing the latex in situ upon the surfaces by application of hot caustic soda to provide caustic resistant adherent protective films.

DWIGHT MEANS.